(12) United States Patent
Barnett

(10) Patent No.: US 11,149,902 B2
(45) Date of Patent: Oct. 19, 2021

(54) GRIP AND STAND ACCESSORY FOR MOBILE ELECTRONIC DEVICE

(71) Applicant: POPSOCKETS LLC, Boulder, CO (US)

(72) Inventor: David B. Barnett, Boulder, CO (US)

(73) Assignee: POPSOCKETS LLC, Boulder, CO (US)

( * ) Notice: Subject to any disclaimer, the term of this patent is extended or adjusted under 35 U.S.C. 154(b) by 175 days.

(21) Appl. No.: 16/374,310

(22) Filed: Apr. 3, 2019

(65) Prior Publication Data

US 2020/0217449 A1 Jul. 9, 2020

Related U.S. Application Data

(63) Continuation of application No. 29/675,903, filed on Jan. 7, 2019, now Pat. No. Des. 928,771.

(51) Int. Cl.
| | |
|---|---|
| *F16M 11/00* | (2006.01) |
| *F16M 13/00* | (2006.01) |
| *H04M 1/04* | (2006.01) |
| *A45F 5/00* | (2006.01) |
| *F16M 13/04* | (2006.01) |

(52) U.S. Cl.
CPC ............ *F16M 13/005* (2013.01); *H04M 1/04* (2013.01); *A45F 5/00* (2013.01); *A45F 2200/0516* (2013.01); *F16M 13/04* (2013.01)

(58) Field of Classification Search
CPC ....... F16M 13/005; F16M 13/04; H04M 1/04; A45F 5/00; A45F 2200/0516; A45C 11/182; A45C 15/00
USPC ........................... 248/688; 455/575.8, 575.1
See application file for complete search history.

(56) References Cited

U.S. PATENT DOCUMENTS

| | | | | |
|---|---|---|---|---|
| 8,560,031 B2 * | 10/2013 | Barnett | .................. | F16M 13/00 |
| | | | | 455/575.8 |
| 9,958,107 B1 * | 5/2018 | Hobbs | ..................... | H04M 1/04 |
| 10,348,352 B2 * | 7/2019 | Barnett | .................. | F16M 13/00 |
| 10,389,860 B2 * | 8/2019 | Nahum | ..................... | A45F 5/10 |
| 10,463,116 B2 * | 11/2019 | Barnett | .................. | F16M 13/00 |
| 10,694,835 B2 * | 6/2020 | Peterson | ................ | A45C 11/00 |
| 10,721,343 B2 * | 7/2020 | Nahum | ................ | F16M 11/041 |
| 10,750,844 B2 * | 8/2020 | Peterson | ................ | A45C 11/00 |
| 10,806,552 B1 * | 10/2020 | Demoss | ................ | A61C 15/043 |
| 10,841,410 B2 * | 11/2020 | Nahum | ..................... | A45F 5/10 |

* cited by examiner

Primary Examiner — Todd M Epps
(74) Attorney, Agent, or Firm — Irell and Manella, LLP

(57) ABSTRACT

An expandable accessory for attachment to a mobile electronic device. The expandable accessory includes a base, a membrane, and a button coupled to the membrane opposite the base. The membrane includes a plurality of linear wall segments. The membrane is movable between a collapsed position and an expanded position, and when the membrane is in the expanded position, the plurality of linear wall segments are arranged in a common conical plane.

26 Claims, 3 Drawing Sheets

GRIP AND STAND ACCESSORY FOR MOBILE ELECTRONIC DEVICE

CROSS-REFERENCE TO RELATED APPLICATIONS

The present application claims priority to U.S. patent application Ser. No. 29/675,903, the entire disclosure of which is hereby incorporated herein by reference.

FIELD OF THE INVENTION

The present invention relates generally to expandable accessories that can be attached to mobile electronic devices (e.g., smart phones, MP3 players) or cases for such mobile electronic devices and used as grips, stands, or for other purposes.

BACKGROUND

Portable electronic devices, such as MP3 players and smart phones, are often housed in protective cases in order to protect the device from damage, provide a grip for handling the device, and/or provide a stand for propping the device on a surface. Expandable accessories, which may be attached directly to the device or to the case protecting the device, are used for a variety of functions, including propping the device on a surface and providing an expandable grip for handling the device. The expandable accessories may include decorative buttons featuring logos, decals, symbols, or other artistic renderings.

SUMMARY

Figure 1:
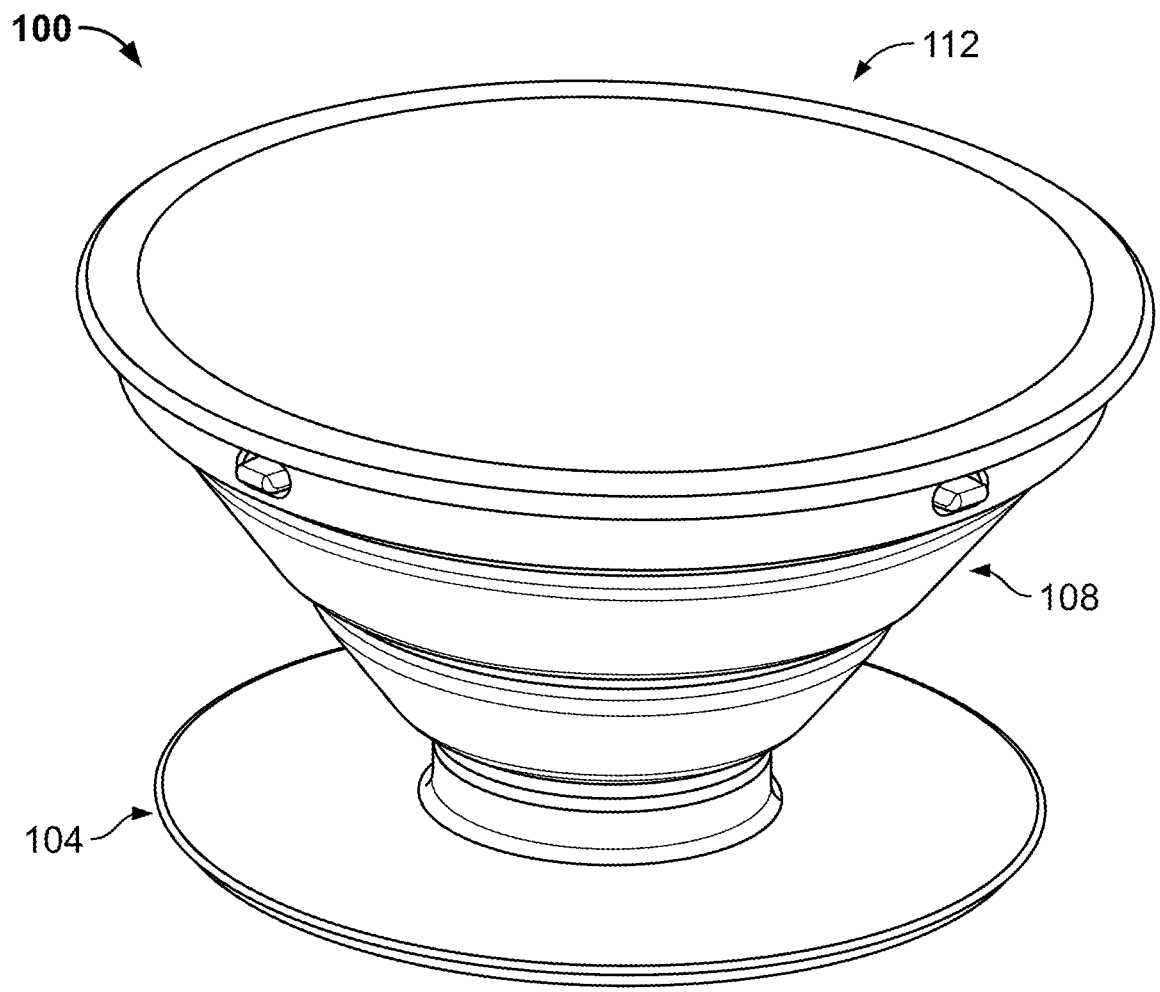
FIG. 1 is a perspective view of one example of an expandable accessory constructed in accordance with the teachings of the present invention, showing the expandable accessory in an expanded position.
Figure 2:
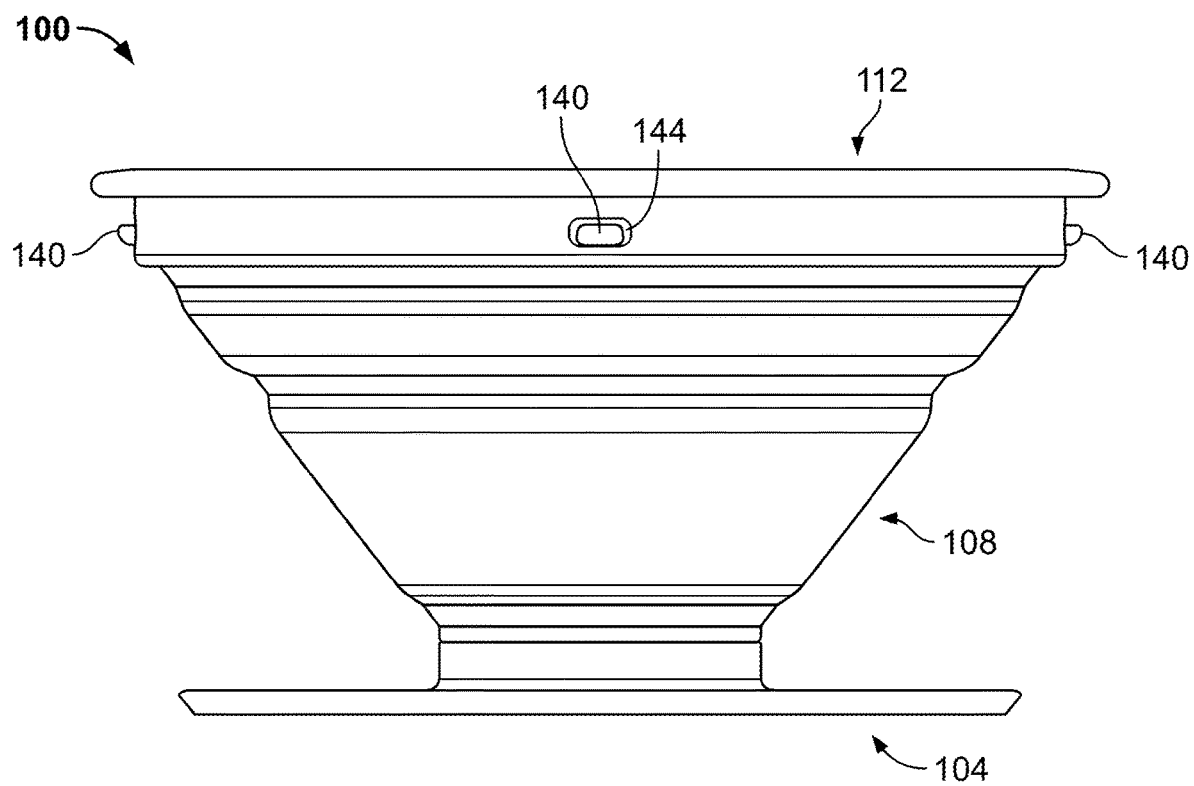
FIG. 2 is a front view of the expandable accessory of FIG. 1.

One aspect of the present invention provides an expandable accessory for attachment to a mobile electronic device. The expandable accessory includes a base, a membrane, and a button coupled to the membrane opposite the base. The membrane includes a plurality of linear wall segments. The membrane is movable between a collapsed position and an expanded position, and when the membrane is in the expanded position, the plurality of linear wall segments are arranged in a common conical plane.

Another aspect of the present invention provides an expandable accessory for attachment to a mobile electronic device. The expandable accessory includes a base, a membrane removably coupled to the base, and a button coupled to the membrane opposite the base. The membrane includes a plurality of linear wall segments. The membrane is movable between a collapsed position and an expanded position, and when the membrane is in the expanded position, the plurality of linear wall segments are arranged in a common conical plane.

Another aspect of the present invention provides a system for attachment to a mobile electronic device. The system includes a case for the mobile electronic device and an expandable accessory coupled to the case. The expandable accessory includes a base, a membrane coupled to the base, and a button coupled to the membrane opposite the base. The membrane includes a plurality of linear wall segments. The membrane is movable between a collapsed position and an expanded position, and when the membrane is in the expanded position, the plurality of linear wall segments are arranged in a common conical plane.

Another aspect of the present invention provides a method. The method includes attaching an expandable accessory to a back of a mobile electronic device or a case for the mobile electronic device, the accessory including a base engaging the back of the mobile electronic device or the case, a membrane coupled to the base and comprising a plurality of linear wall segments, and a button coupled to the membrane opposite the base, wherein the membrane is movable between a collapsed position and an expanded position, in which the plurality of linear wall segments are arranged in a common conical plane.

DETAILED DESCRIPTION OF THE PREFERRED EMBODIMENTS

FIGS. 1-4 illustrate one example of an expandable accessory 100 constructed in accordance with the teachings of the present invention. The expandable accessory 100 is generally configured to be attached to a mobile electronic device, e.g., a smart phone, an MP3 player, a tablet, or the like. When the expandable accessory 100 is attached to a mobile electronic device, the expandable accessory 100 can be used as an adjustable stand that supports the mobile electronic device at a variety of different positions, to allow a user of the mobile electronic device to grip and/or carry the mobile electronic device, to wrap headphones for the mobile electronic device, and/or to perform other desired functionality.

The expandable accessory 100 in this example generally includes a base 104, a membrane 108 coupled to the base 104, and a button 112 coupled to the membrane 108 opposite the base 104. The membrane 108 is generally movable between an expanded position, shown in FIG. 3, and a collapsed position, shown in FIG. 4, along a longitudinal axis 110 of the expandable accessory 100. When the membrane 108 is in the expanded position, the expanded accessory 100 can be used in any of the various ways discussed above. However, when the membrane 108 is in the collapsed position, the membrane 108 (and, in turn, the expandable accessory 100) has a much smaller profile. The expanded accessory 100 can nonetheless be used in any of the various ways discussed above or can simply be in a storage position. In other examples, the expandable accessory 100 may include additional, fewer, or different components. As an example, the expandable accessory 100 may include a biasing element (e.g., a spring) that biases the membrane 108 to the expanded position or to the collapsed position, and/or a lock that releasably secures the membrane 108 in the expanded position or the collapsed position.

As best illustrated in FIG. 1, the base 104 in this example has an annular shape. In other examples, however, the base 104 can instead have a rectangular, square, triangular, or other shape. The base 104 is preferably made of metal or plastic, though other suitable materials can be used. In any case, the base 104 is generally configured to be directly or indirectly coupled (e.g., attached, mounted) to the mobile electronic device or a case of such a mobile electronic device. To this end, the base 104 can, in some cases, include a securing element known to one of ordinary skill in the art, such as, for example, adhesive, glue, tape, a suction cup, a snap-fit connection, a friction fit, other means, or combinations thereof. Alternatively, in other cases, the base 104 can be integrally formed with the mobile electronic device or the case.

As also best illustrated in FIG. 1, the button 112 in this example also has an annular shape. In other examples, however, the button 112 can have a rectangular, square, triangular, irregular, or other shape. The button 112 in this example is imperforate and has an outer diameter that is larger than an outer diameter of the base 104, though that this need not be the case. As an example, the outer diameter of the button 112 can be substantially equal to the outer diameter of the base 104. Like the base 104, the button 112 is preferably made of metal or plastic, though other suitable materials can be used. The button 112 has an outer side 116 that can, for example, include a design (including, e.g., a logo, text, graphics, a picture, or combinations thereof). In some cases, the design can be selected by a user of the expandable accessory 100.

The membrane 108 is generally coupled to and disposed between the base 104 and the button 112. The membrane 108 preferably takes the form of an elastomeric skin (made of an elastomeric material) that is bistable, i.e., the membrane 108 has two stable states in which movement is resisted (at least initially), with one of the stable states being the expanded position shown in FIG. 3, and the other of the stable states being the collapsed position shown in FIG. 4. More particularly, the membrane 108 includes a plurality of linear wall segments 120 arranged between the base 104 and the button 112 as well as one or more hinges 124 arranged between each pair of adjacent linear wall segments 120. In this example, the membrane 108 includes three linear wall segments 120 and two hinges 124, with a first hinge 124A arranged between a first pair of adjacent linear wall segments 120 and a second hinge 124b arranged between a second pair of adjacent linear wall segments 120. In other examples, however, the membrane 108 can include more or less linear wall segments 120 and more or less hinges 124. In one other example, the membrane 108 can include two linear wall segments 120 and one hinge 124 arranged therebetween.

The membrane 108 may be coupled to the base 104 in any number of different ways. In some examples, the membrane 108 may be fixedly (i.e., non-removably) coupled to the base 104, such that the membrane 108 cannot be removed from the base 104 without destroying the expandable accessory 100. As an example, the membrane 108 may be adhered (e.g., glued) to or integrally formed with the base 104. In other examples, however, such as the one illustrated in FIGS. 1-4, the membrane 108 is removably coupled to the base 104. In this example, the membrane 108 is removably coupled to the base 104 by way of a downwardly and outwardly extending first connector 128 that is carried by the membrane 108 and is arranged to matingly engage a second connector 132 that is carried by an inwardly extending flange 136 of the base 104. It will nonetheless be appreciated that the first connector 132 can instead be carried by the membrane 108 and the second connector 132 can instead be carried by the base 104.

Similarly, the button 112 may be coupled to the membrane 108 in any number of different ways. In some examples, the button 112 may be fixedly (i.e., non-removably) coupled to the membrane 108, such that the membrane 108 cannot be removed from the button 112 without destroying the expandable accessory 100. As an example, the button 112 may be adhered (e.g., glued) to or integrally formed with the membrane 108. In other examples, however, such as the one illustrated in FIGS. 1-4, the button 112 is removably coupled to the membrane 108. In this example, the button 112 is removably coupled to the membrane 108 by way of a plurality of tabs 140 carried by (and extending outward from) the button 112 and removably disposed in a plurality of slots 144 formed in the membrane 108. It will nonetheless be appreciated that the plurality of tabs 140 can instead be carried by the membrane 108 and the plurality of slots 144 can instead be formed in the button 112.

Figure 3:
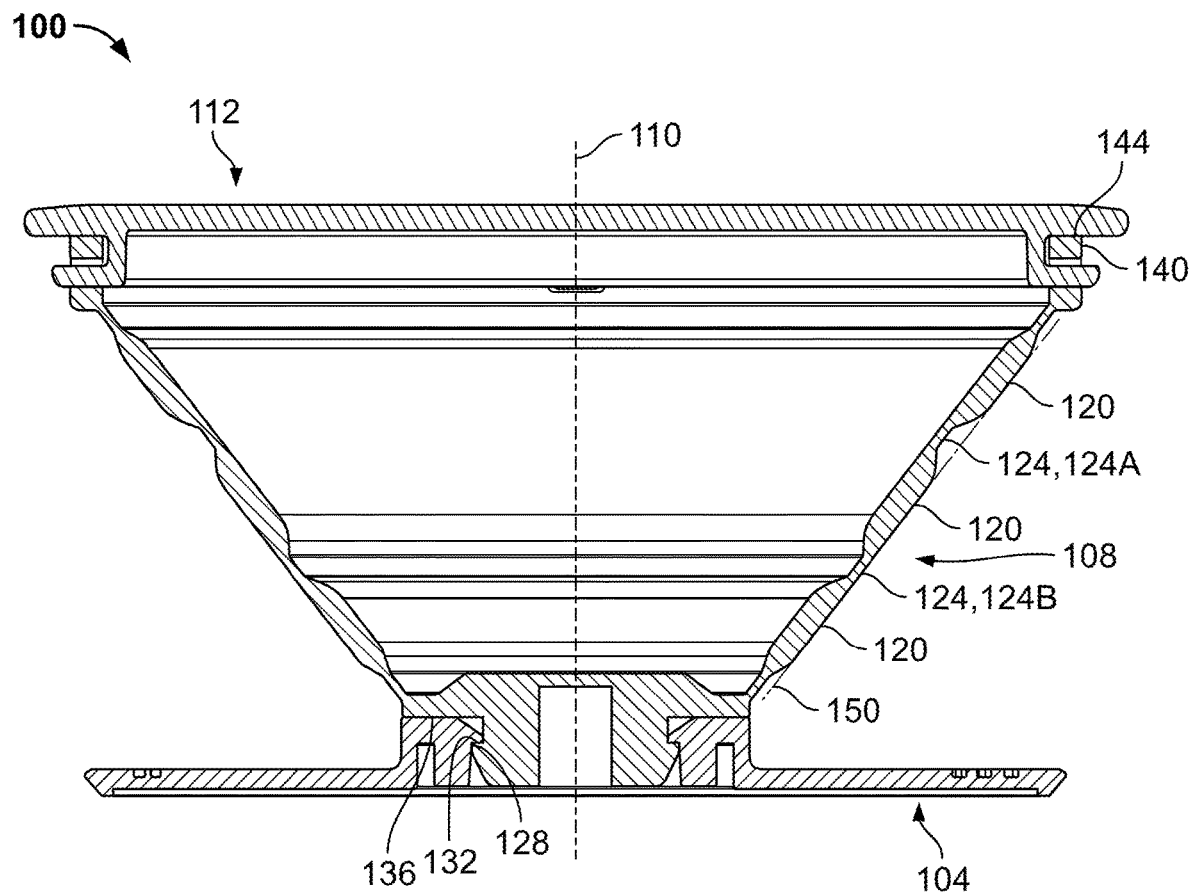
FIG. 3 is a cross-sectional view of the expandable accessory of FIG. 2.
Figure 4:
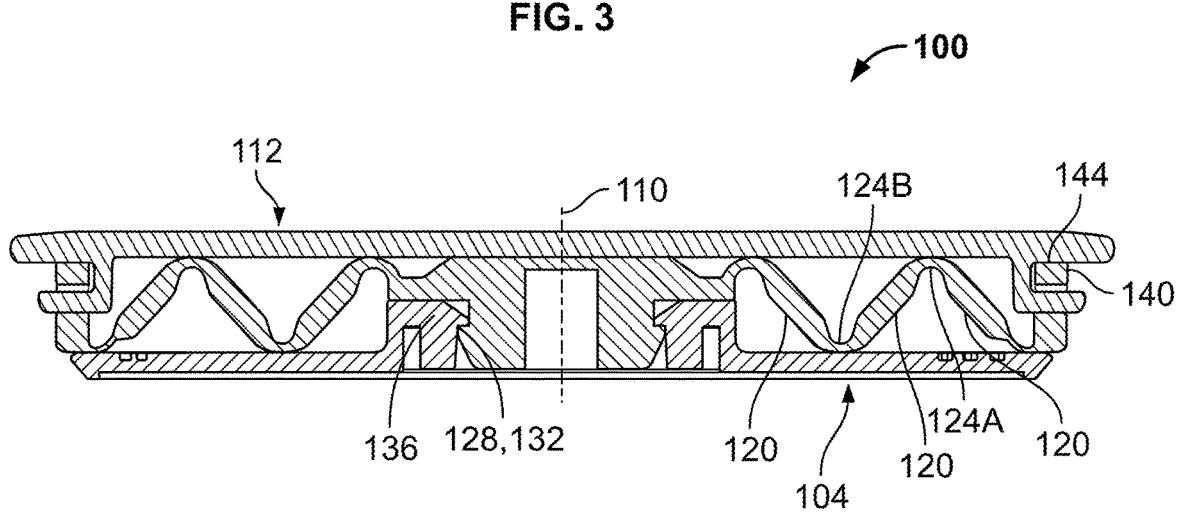
FIG. 4 is similar to FIG. 3, but shows the expandable accessory in a collapsed position.

In operation, the membrane 108 is movable between the expanded position shown in FIG. 3 and the collapsed position shown in FIG. 4 by manipulating the membrane 108 and/or the button 112. The user of the expandable accessory 100 may, for example, move the membrane 108 from the collapsed position to the expanded position by grabbing or grasping the button 112 and pulling the button 112 upward, away from the base 104, along the longitudinal axis 110. When the membrane 108 reaches the expanded position shown in FIG. 3, the plurality of linear wall segments 120 are arranged in a common conical plane (e.g., conical plane 150) and the hinges 124, which separate the linear wall segments 120, reside in the common conical plane. As a result of this linear arrangement, the membrane 108 has a frustoconical shape that tapers from the button 112 to the base 104 (though the membrane 108 could instead taper from the base 104 to the button 112). When the membrane 108 is in this expanded position, the button 112 is stably spaced from the base 104 so as to permit the user of the expandable accessory 100 to perform any of the desired functionality discussed above (e.g., to wrap a headphone cord of the mobile electronic device around a portion of the expandable accessory 100, to form an adjustable stand for the mobile electronic device, to form a grip for the mobile electronic device).

Conversely, the user of the expandable accessory 100 may move the membrane 108 from the expanded position to the collapsed position by grabbing or grasping the button 112 and pushing the button 112 downward, toward from the base 104, along the longitudinal axis 110. In turn, the hinges 124 of the membrane 108 facilitate movement of the plurality of linear wall segments 120 relative to one another until the membrane 108 reaches the collapsed position shown in FIG. 4. When the membrane 108 is in the collapsed position, the linear wall segments 120 are no longer arranged in the same manner as they are arranged when the membrane 108 is in the expanded position. More particularly, the linear wall segments 120 are no longer stacked on top of another so that the linear wall segments 120 are arranged in the common conical plane 150. Instead, the linear wall segments 120 are folded up next to one another. In the example illustrated in FIG. 4, the linear wall segments 120 are folded such that a second linear wall segment 120B is disposed radially inwardly of and angled relative to a first linear wall segment 120A and a third linear wall segment 120C is disposed radially inwardly of and angled relative to the second linear wall segment 120 but parallel to the first linear wall segment 120A. As a result of this arrangement, the membrane 108 has a frustoconical shaped portion that surrounds a conical shaped portion. Both the frustoconical shaped portion and the conical shaped portion taper from the button 112 to the base 104.

It will nonetheless be appreciated that in other examples, the linear wall segments 120 can be arranged in a different manner when the membrane 108 is in the collapsed position.

As an example, the linear wall segments 120 can be folded such that each of the linear wall segments 120 is parallel to or substantially parallel to one another. As another example, the linear wall segments 120 can be folded such that each of the linear wall segments 120 is angled relative to the other linear wall segments 120. Other arrangements are possible as well.

The invention claimed is:

1. An expandable accessory for attachment to a mobile electronic device, the expandable accessory comprising:
   a base;
   a membrane coupled to the base and comprising a plurality of linear wall segments, wherein the membrane is movable between a collapsed position and an expanded position, wherein when the membrane is in the expanded position, the plurality of linear wall segments are arranged in a common conical plane, wherein the membrane further comprises one or more hinges separating the plurality of linear wall segments, and wherein when the membrane is in the expanded position, the one or more hinges reside in the common conical plane; and
   a button coupled to the membrane opposite the base.

2. The expandable accessory of claim 1, wherein when the membrane is in the expanded position, the membrane has a frustoconical shape.

3. The expandable accessory of claim 1, wherein the one or more hinges facilitate movement of the membrane between the expanded and collapsed positions.

4. The expandable accessory of claim 1, wherein when the membrane is in the collapsed position, a first linear wall segment of the plurality of linear wall segments is angled relative to a second linear wall segment of the plurality of linear wall segments.

5. The expandable accessory of claim 1, wherein the membrane is made of an elastomeric material.

6. The expandable accessory of claim 1, wherein the membrane tapers from the button to the base.

7. The expandable accessory of claim 1, wherein the base is removably coupled to the membrane.

8. The expandable accessory of claim 7, wherein the membrane has a first connector that is arranged to matingly engage a second connector carried by the base to removably couple the base to the membrane.

9. The expandable accessory of claim 1, wherein the button is imperforate.

10. An expandable accessory for attachment to a mobile electronic device, the expandable accessory comprising:
    a base;
    a membrane removably coupled to the base and comprising a plurality of linear wall segments, wherein the membrane is movable between a collapsed position and an expanded position, and wherein when the membrane is in the expanded position, the plurality of linear wall segments are arranged in a common conical plane; and
    a button coupled to the membrane opposite the base, wherein when the membrane is in the expanded position, the membrane has a frustoconical shape, wherein the membrane further comprises one or more hinges separating the plurality of linear wall segments, and wherein when the membrane is in the expanded position, the one or more hinges reside in the common conical plane.

11. The expandable accessory of claim 10, wherein the one or more hinges facilitate movement of the membrane between the expanded and collapsed positions.

12. The expandable accessory of claim 10, wherein when the membrane is in the collapsed position, a first linear wall segment of the plurality of linear wall segments is angled relative to a second linear wall segment of the plurality of linear wall segments.

13. The expandable accessory of claim 10, wherein the membrane is made of an elastomeric material.

14. The expandable accessory of claim 10, wherein the membrane tapers from the button to the base.

15. The expandable accessory of claim 10, wherein the membrane has a first connector that is arranged to matingly engage a second connector carried by the base to removably couple the base to the membrane.

16. The expandable accessory of claim 10, wherein the button is imperforate.

17. A system for attachment to a mobile electronic device, the system comprising:
    a case for the mobile electronic device;
    an expandable accessory coupled to the case, the expandable accessory comprising:
      a base;
      a membrane coupled to the base and comprising a plurality of linear wall segments, wherein the membrane is movable between a collapsed position and an expanded position, wherein when the membrane is in the expanded position, the plurality of linear wall segments are arranged in a common conical plane, wherein the membrane further comprises one or more hinges separating the plurality of linear wall segments, and wherein when the membrane is in the expanded position, the one or more hinges reside in the common conical plane; and
      a button coupled to the membrane opposite the base.

18. The system of claim 17, wherein when the membrane is in the expanded position, the membrane has a frustoconical shape.

19. The system of claim 17, wherein the one or more hinges facilitate movement of the membrane between the expanded and collapsed positions.

20. The system of claim 17, wherein when the membrane is in the collapsed position, a first linear wall segment of the plurality of linear wall segments is angled relative to a second linear wall segment of the plurality of linear wall segments.

21. The system of claim 17, wherein the membrane is made of an elastomeric material.

22. The system of claim 17, wherein the membrane tapers from the button to the base.

23. The system of claim 17, wherein the base is removably coupled to the membrane.

24. The system of claim 23, wherein the membrane has a first connector that is arranged to matingly engage a second connector carried by the base to removably couple the base to the membrane.

25. The system of claim 17, wherein the button is imperforate.

26. A method for using an expandable accessory, comprising:
    attaching the expandable accessory to a back of a mobile electronic device or a case for the mobile electronic device by engaging the back of the mobile electronic device or the case with a base of the expandable accessory, wherein the expandable accessory comprises a membrane coupled to the base, a plurality of linear wall segments, and a button coupled to the membrane opposite the base, wherein the membrane further comprises one or more hinges separating the plurality of linear wall segments; and moving the membrane between a collapsed position and an expanded position, in which the plurality of linear wall segments and the one or more hinges are arranged in a common conical plane.

\* \* \* \* \*